(12) United States Patent
Kurabayashi

(10) Patent No.: US 10,599,256 B2
(45) Date of Patent: Mar. 24, 2020

(54) PROGRAM, ELECTRONIC DEVICE, SYSTEM, AND CONTROL METHOD WITH WHICH TOUCH TARGET IS PREDICTED ON BASIS OF OPERATION HISTORY

(71) Applicant: CYGAMES, INC., Tokyo (JP)

(72) Inventor: Shuichi Kurabayashi, Tokyo (JP)

(73) Assignee: Cygames, Inc., Tokyo (JP)

(*) Notice: Subject to any disclaimer, the term of this patent is extended or adjusted under 35 U.S.C. 154(b) by 0 days.

(21) Appl. No.: 15/889,000

(22) Filed: Feb. 5, 2018

(65) Prior Publication Data

US 2018/0157372 A1 Jun. 7, 2018

Related U.S. Application Data

(63) Continuation of application No. PCT/JP2016/072972, filed on Aug. 4, 2016.

(30) Foreign Application Priority Data

Aug. 5, 2015 (JP) .................. 2015-155244

(51) Int. Cl.
*G06F 3/041* (2006.01)
*A63F 13/422* (2014.01)
(Continued)

(52) U.S. Cl.
CPC ........ *G06F 3/0416* (2013.01); *A63F 13/2145* (2014.09); *A63F 13/422* (2014.09);
(Continued)

(58) Field of Classification Search
CPC .. A63F 13/2145; A63F 13/422; A63F 13/426; G06F 3/0416; G06F 3/04817; G06F 3/04842; G06F 3/0488; G06F 3/04886
See application file for complete search history.

(56) References Cited

U.S. PATENT DOCUMENTS 5,882,258 A * 3/1999 Kelly .................. A63F 1/00
    273/292
2004/0239636 A1 * 12/2004 Takahashi ............. G06F 3/0237
    345/169
(Continued)

FOREIGN PATENT DOCUMENTS

| JP | H10-275046 A | 10/1998 |
| JP | 2000-066817 A | 3/2000 |
| JP | 2004-355289 A | 12/2004 |

OTHER PUBLICATIONS

International Search Report issued in Application No. PCT/JP2016/072972, dated Sep. 13, 2016 (2 pages).
(Continued)

*Primary Examiner* — Mihir K Rayan
(74) *Attorney, Agent, or Firm* — Osha Liang LLP

(57) ABSTRACT

The present invention is a program for causing an electronic device having a display unit and a contact-type position input unit to execute displaying a screen including objects associated with events on the display unit; detecting, in the case where a touch on the contact-type position input unit is detected and two or more objects are located within a predetermined distance from the detected touched coordinates; selecting candidate objects in the case where the touch is detected, the candidate objects being the two or more objects located within the predetermined distance from the detected touched coordinates; determining weights relating to the occurrence of individual candidate events, the candidate events being events associated with the individual selected candidate objects, on the basis of the candidate events, a sequence of events executed immediately before, and event history information; and executing or presenting the candidate event having the highest weight.

18 Claims, 15 Drawing Sheets

(51) Int. Cl.
*G06F 3/0484* (2013.01)
*G06F 3/0488* (2013.01)
*A63F 13/79* (2014.01)
*A63F 13/426* (2014.01)
*A63F 13/2145* (2014.01)
*G06F 3/0481* (2013.01)

(52) U.S. Cl.
CPC ............ *A63F 13/426* (2014.09); *A63F 13/79* (2014.09); *G06F 3/04842* (2013.01); *G06F 3/04886* (2013.01); *G06F 3/0488* (2013.01); *G06F 3/04817* (2013.01)

(56) References Cited

U.S. PATENT DOCUMENTS

| | | | |
|---|---|---|---|
| 2011/0242137 A1* | 10/2011 | Lee ................... | G06F 3/04886 345/660 |
| 2013/0038540 A1* | 2/2013 | Anderson ............ | G06F 3/0488 345/173 |
| 2015/0089435 A1* | 3/2015 | Kuzmin ................ | G06N 5/003 715/773 |

OTHER PUBLICATIONS

Written Opinion issued in Application No. PCT/JP2016/072972, dated Sep. 13, 2016 (4 pages).

* cited by examiner

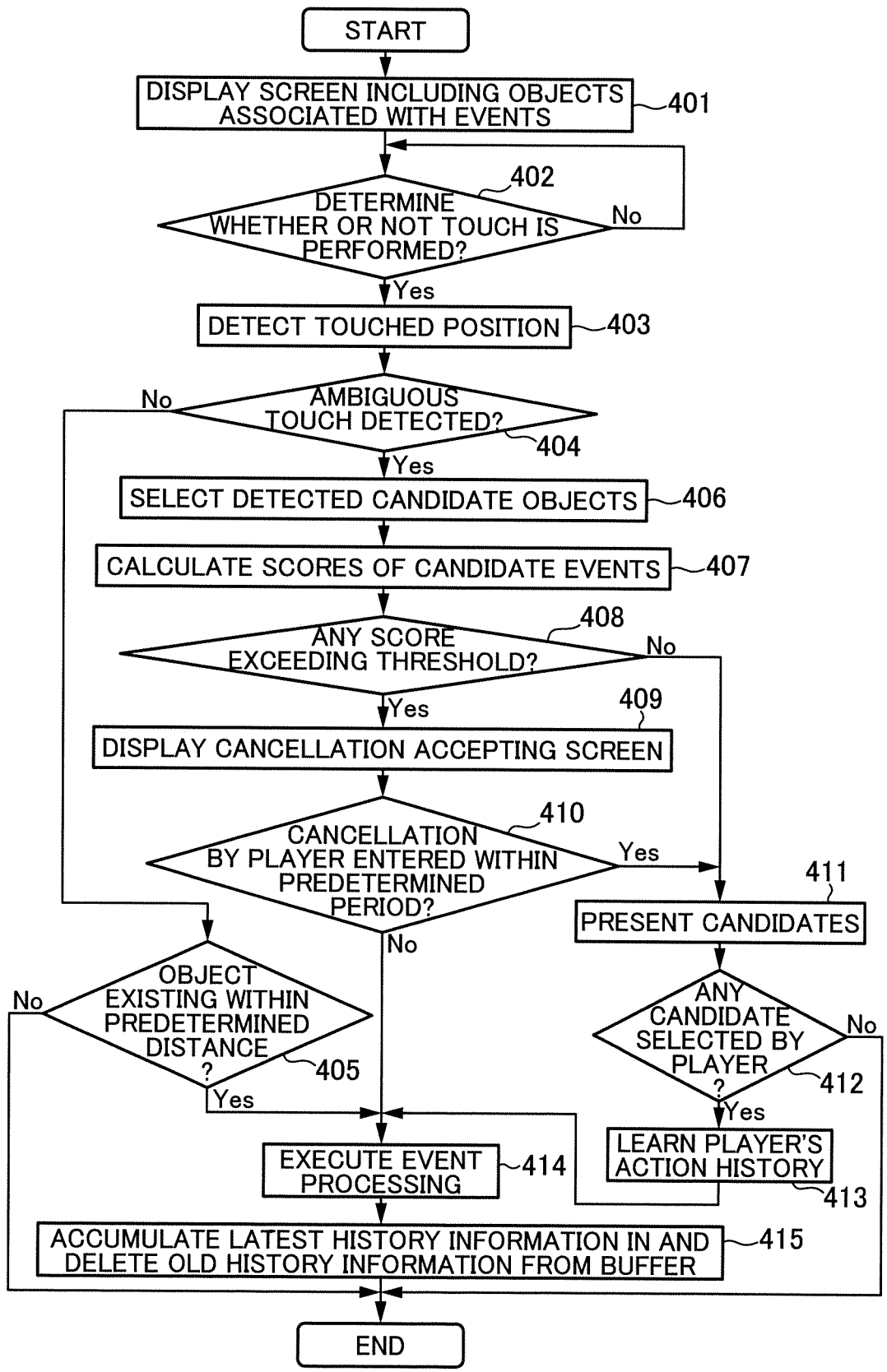

```
2-gram    AB:200TIMES    BA:1TIME ···

3-gram    ABA:123TIMES   ABC:4TIMES ···

4-gram    ABAB:89TIMES   BABC:45TIMES ···

.
   .
   .

N-gram    AA···AA:○○TIMES ···
```

PROGRAM, ELECTRONIC DEVICE, SYSTEM, AND CONTROL METHOD WITH WHICH TOUCH TARGET IS PREDICTED ON BASIS OF OPERATION HISTORY

TECHNICAL FIELD

The present invention relates to a program, an electronic device, a system, and a control method with which a touch target is predicted on the basis of an operation history.

BACKGROUND ART

With the recent improvements in the touchscreen technology, electronic devices of the type in which user inputs are made via user interfaces on a touchscreen have become widespread. Furthermore, in games that are executed on electronic devices, user inputs of the form that are made via a touchscreen provided on an electronic device are becoming widespread instead of user inputs made via conventional physical controllers.

In particular, compact portable electronic devices, such as smartphones, have rapidly become popular, and a large number of games that are executed on such portable electronic devices have been released. When a player operates such a game with a finger or the like, there are cases where the tapped position assumed by the player considerably deviates from the position of the tap event recognized by the electronic device.

Furthermore, in games in which players are given high degrees of freedom in operation, while a large number of user interface objects that can be selected are involved, smartphone screens have only restricted areas, which results in a tendency that objects become densely concentrated. In operating densely concentrated objects, it is difficult to precisely tap the center of a specific user interface object, and thus incorrect inputs tend to occur.

Existing technologies that serve as solutions to incorrect inputs include an approach in which the operation mode is switched to change the method of recognizing a tapped position and an approach described in Patent Literature 1 in which an input for an incorrect tap on a user interface having a static layout, like a software keyboard, is corrected.

CITATION LIST

Patent Literature

{PTL 1}
Japanese Unexamined Patent Application, Publication No. 2000-66817

SUMMARY OF INVENTION

Technical Problem

However, there has been no technology that makes it possible to correct an incorrect tap seamlessly without having to change the operation mode with a user interface having a dynamic layout, like a game.

As described earlier, in the case where a player performs an operation on a screen in which objects are densely concentrated, since it is difficult for the player to precisely tap a specific object, there is a high possibility of an incorrect tap. Specifically, when the size of a finger (10 to 15 mm) and the size of the point of occurrence of a tap event recognized by an electronic device (1 point=0.16 to 0.35 mm) are compared with each other, there is a difference in size of a factor of about 30 to 100, and thus there is a high possibility that the tap position assumed by the player considerably deviates from the position of the tap event recognized by the electronic device. In particular, in a game in which 3D objects are densely displayed on a screen, there is a high possibility that unintended control is executed due to this mismatch in the recognition of the tapped position. This kind of mismatch is becoming more conspicuous as the resolutions of displays become higher. This might impose on players a stress that is not really intended by the game, thus acting as a hindrance to players becoming immersed in the world created by the game.

The applicant of the present application defined a touch (tap) with which it was difficult to uniquely determine which object had been selected as an ambiguous touch (tap) and considered that the incorrect taps described above were attributable to ambiguous taps. Accordingly, it is an object of the present invention to correct an incorrect touch by estimating a touched position assumed by a player to exclude ambiguity in a touch operation when an ambiguous touch is performed.

Solution to Problem

The present invention has been made in view of the problem described above and has the following features. Specifically, a non-transitory computer readable medium storing a program according to an aspect of the present invention is a non-transitory computer readable medium storing a program executed on an electronic device that has a display unit and a contact-type position input unit and that detects a touched position corresponding to a touch on the contact-type position input unit by a player in the form of coordinates on the contact-type position input unit, the program causing the electronic device to execute a step of displaying a screen including objects associated with events on the display unit; a step of detecting, in the case where a touch on the contact-type position input unit is detected and two or more of the objects are located within a predetermined distance from the detected touched coordinates, the detected touch as being an ambiguous touch; a step of selecting candidate objects in the case where the ambiguous touch is detected, the candidate objects being the two or more objects located within the predetermined distance from the detected touched coordinates; a step of determining weights relating to the occurrence of individual candidate events, the candidate events being events associated with the individual selected candidate objects, on the basis of the candidate events, an event or a sequence of events executed immediately before, and event history information including information about executed events; and a step of executing the candidate event having the highest weight or presenting the player with a confirmation for the execution of the candidate events having the highest weight.

As an aspect of the present invention, the step of detecting the detected touch as being an ambiguous touch is a step that is executed in the case where the detected touched coordinates do not fall within a coordinate range corresponding to one of the objects, and the program further causes the electronic device to execute a step of executing the event associated with the object in the case where the detected touched coordinates fall within the coordinate range corresponding to one of the objects.

As an aspect of the present invention, the event history information includes event frequency information representing the frequencies of occurrence of individual patterns of event sequences constituted of two or more consecutive events in a history of executed events.

As an aspect of the present invention, the event frequency information includes information representing the frequencies of occurrence of individual patterns of event sequences constituted of not more than N (N≥2) consecutive events, and the step of determining weights includes a step of calculating scores representing the possibilities of occurrence of the individual candidate events on the basis of the frequencies of occurrence of sequences of n (2≤n≤N) consecutive events in the event frequency information, the sequences of n consecutive events being constituted of an event or a sequence of events executed immediately before the candidate events and the candidate events.

As an aspect of the present invention, the step of calculating scores includes a step of calculating the scores for each of the candidate events with individual values of n=n1 to n2 (2≤n1<n2≤N), multiplying the calculated scores by predetermined coefficients corresponding to the magnitudes of the values of n, and adding the results together.

As an aspect of the present invention, the program further causes the electronic device to execute a step of storing executed events.

As an aspect of the present invention, the electronic device is connected to a server via a network, and the program further causes the electronic device to execute a step of receiving the event history information from the server; and a step of sending information including executed events to the server in order to store the executed events at the server.

A non-transitory computer readable medium storing a program according to an aspect of the present invention is a program executed on an electronic device that is connected to a server via a network, that has a display unit and a contact-type position input unit, and that detects a touched position corresponding to a touch on the contact-type position input unit by a player in the form of coordinates on the contact-type position input unit, the program causing the electronic device to execute a step of displaying a screen including objects associated with events on the display unit; a step of detecting, in the case where a touch on the contact-type position input unit is detected and two or more of the objects are located within a predetermined distance from the detected touched coordinates, the detected touch as being an ambiguous touch; a step of selecting candidate objects in the case where the ambiguous touch is detected, the candidate objects being the two or more objects located within the predetermined distance from the detected touched coordinates; a step of sending information including candidate events to the server in order to let the server determine weights relating to the occurrence of the individual candidate events, the candidate events being events associated with the individual selected candidate objects, on the basis of the candidate events, an event or a sequence of events executed immediately before, and event history information including information about executed events; a step of receiving the weights from the server; and a step of executing the candidate event having the highest weight or presenting the player with a confirmation for the execution of the candidate events having the highest weight.

As an aspect of the present invention, the step of detecting the detected touch as being an ambiguous touch is a step that is executed in the case where the detected touched coordinates do not fall within a coordinate range corresponding to the object, and the program further causes the electronic device to execute a step of executing the event associated with the object in the case where the detected touched coordinates fall within the coordinate range corresponding to the object.

As an aspect of the present invention, the event history information includes event frequency information representing the frequencies of occurrence of individual patterns of event sequences constituted of two or more consecutive events among past executed events.

As an aspect of the present invention, the program causes the electronic device to further execute a step of sending information including executed events to the server in order to store the executed events at the server.

An electronic device according to an aspect of the present invention is an electronic device having a display unit and a contact-type position input unit, the electronic device including a touched-position detecting part configured to detect a touched position corresponding to a touch on the contact-type position input unit by a player in the form of coordinates of the contact-type position input unit; a screen displaying part configured to display a screen including objects associated with events on the display unit; an ambiguous-touch detecting part configured to detect, in the case where a touch on the contact-type position input unit is detected and two or more of the objects are located within a predetermined distance from the detected touched coordinates, the detected touch as being an ambiguous touch; a candidate-object selecting part configured to select candidate objects in the case where the ambiguous touch is detected, the candidate objects being the two or more objects located within the predetermined distance from the detected touched coordinates; a weight-determining part configured to determine weights relating to the occurrence of individual candidate events, the candidate events being events associated with the individual selected candidate objects, on the basis of the candidate events, an event or a sequence of events executed immediately before, and event history information including information about executed events; and a candidate-event executing part configured to execute the candidate event having the highest weight or a candidate-event presenting part configured to present the player with a confirmation for the execution of the candidate event having the highest weight.

A system according to an aspect of the present invention is a system including a server and an electronic device that is connected to the server via a network, that has a display unit and a contact-type position input unit, and that detects a touched position corresponding to a touch on the contact-type position input unit by a player in the form of coordinates on the contact-type position input unit, the server or the electronic device including a screen displaying part configured to display a screen including objects associated with events on the display unit; an ambiguous-touch detecting part configured to detect, in the case where a touch on the contact-type position input unit is detected and two or more of the objects are located within a predetermined distance from the detected touched coordinates, the detected touch as being an ambiguous touch; a candidate-object selecting part configured to select candidate objects in the case where the ambiguous touch is detected, the candidate objects being the two or more objects located within the predetermined distance from the detected touched coordinates; a weight-determining part configured to determine weights relating to the occurrence of individual candidate events, the candidate events being events associated with the individual selected candidate objects, on the basis of the candidate events, an event or a sequence of events executed immediately before, and event history information including information about executed events; and a candidate-event executing part configured to execute the candidate event having the highest weight or a candidate-event presenting part configured to present the player with a confirmation for the execution of the candidate event having the highest weight.

As an aspect of the present invention, the ambiguous-touch detecting means is a part configured to detect the ambiguous touch in the case where the detected touched coordinates do not fall within a coordinate range corresponding to the object, and the electronic device further includes an event executing part configured to execute the event associated with the object in the case where the detected touched coordinates fall within the coordinate range corresponding to the object.

As an aspect of the present invention, the server or the electronic device in the system further includes a storage part configured to store executed events, and the storage means creates event history information including event frequency information representing the frequencies of occurrence of individual patterns of event sequences constituted of two or more consecutive events in a history of the events stored in the storage means.

As an aspect of the present invention, the event frequency information includes information representing the frequencies of occurrence of individual patterns of event sequences constituted of not more than N (N≥2) consecutive events, and the weight determining means includes a score calculating part configured to calculate scores representing the possibilities of occurrence of the individual candidate events on the basis of the frequencies of occurrence of sequences of n (2≤n≤) consecutive events in the event frequency information, the sequences of n consecutive events being constituted of an event or a sequence of events executed immediately before the candidate events and the candidate events.

A control method according to an aspect of the present invention is a control method for a system including a server and an electronic device that is connected to the server via a network, that has a display unit and a contact-type position input unit and that detects a touched position corresponding to a touch on the contact-type position input unit by a player in the form of coordinates on the contact-type position input unit, the control method including a step of displaying a screen including objects associated with events on the display unit; a step of detecting, in the case where a touch on the contact-type position input unit is detected and two or more of the objects are located within a predetermined distance from the detected touched coordinates, the detected touch as being an ambiguous touch; a step of selecting candidate objects in the case where the ambiguous touch is detected, the candidate objects being the two or more objects located within the predetermined distance from the detected touched coordinates; a step of determining weights relating to the occurrence of individual candidate events, the candidate events being events associated with the individual selected candidate objects, on the basis of the candidate events, an event or a sequence of events executed immediately before, and event history information including information about executed events; and a step of executing the candidate event having the highest weight or presenting the player with a confirmation for the execution of the candidate events having the highest weight, wherein each of these steps is executed by the server or the electronic device.

As an aspect of the present invention, the step of detecting the detected touch as being an ambiguous touch is a step that is executed in the case where the detected touched coordinates do not fall within a coordinate range corresponding to the object, and the control method further includes a step of executing the event associated with the object in the case where the detected touched coordinates fall within the coordinate range corresponding to the object, which is executed by the server or the electronic device.

Advantageous Effects of Invention

According to the present invention, by realizing a user interface for estimating an object that a player wishes to select with a touch on the basis of a past operation history of that player, it is possible to overcome the situation where it is difficult to select a desired object with a touch from among a group of densely concentrated objects, without having to perform a mode switching operation in a game. In processing for predicting an action intended by the player, in which the operation history including a huge number of combinations is narrowed down, it is possible to quickly narrow down the operation history since objects located within a predetermined distance from a physical touched position are used as search keys. By predicting and correcting touch operations continuously in real time in the manner described above, in the field of games, in which high response performance is required, it is possible to realize real-time usage and utilization of big data, thereby realizing a basis for an action prediction engine that predicts the next operation by a player. Furthermore, by also obtaining an operation history of the player in real time, it becomes possible to learn the tendencies of touch operations by the player without the player having to explicitly make settings.

BRIEF DESCRIPTION OF DRAWINGS

FIG. 4 is a flowchart showing information processing according to one embodiment of the present invention.

DESCRIPTION OF EMBODIMENTS

Now, embodiments of the present invention will be described with reference to the drawings. A system according to an embodiment of the present invention can be implemented by a system in which a plurality of electronic devices are connected via a network or by a single electronic device. An embodiment in which a system is implemented by a single electronic device will be described first, and then a system connected to a network will be described. Although it is assumed in the description that the system connected to the network is a server-client system, the system may be configured to be a system not including a server, such as a P-to-P system.

Furthermore, although the embodiments will be described mainly in the context of game systems, the embodiments may be used in other systems. A game involved in the embodiments is a game in which a plurality of objects are disposed on the screen. The objects include objects associated with events and objects not associated with events. In the case where an object associated with an event is selected, predetermined game processing or control associated with that object is executed. In the case where an object not associated with an event is selected, although predetermined game processing or control is not executed, it is possible to indicate to the player that the object has been touched. Hereinafter, what is simply referred to as an object refers to an object associated with an event unless specifically mentioned otherwise.

Embodiment Implemented by an Electronic Device

Figure 1:
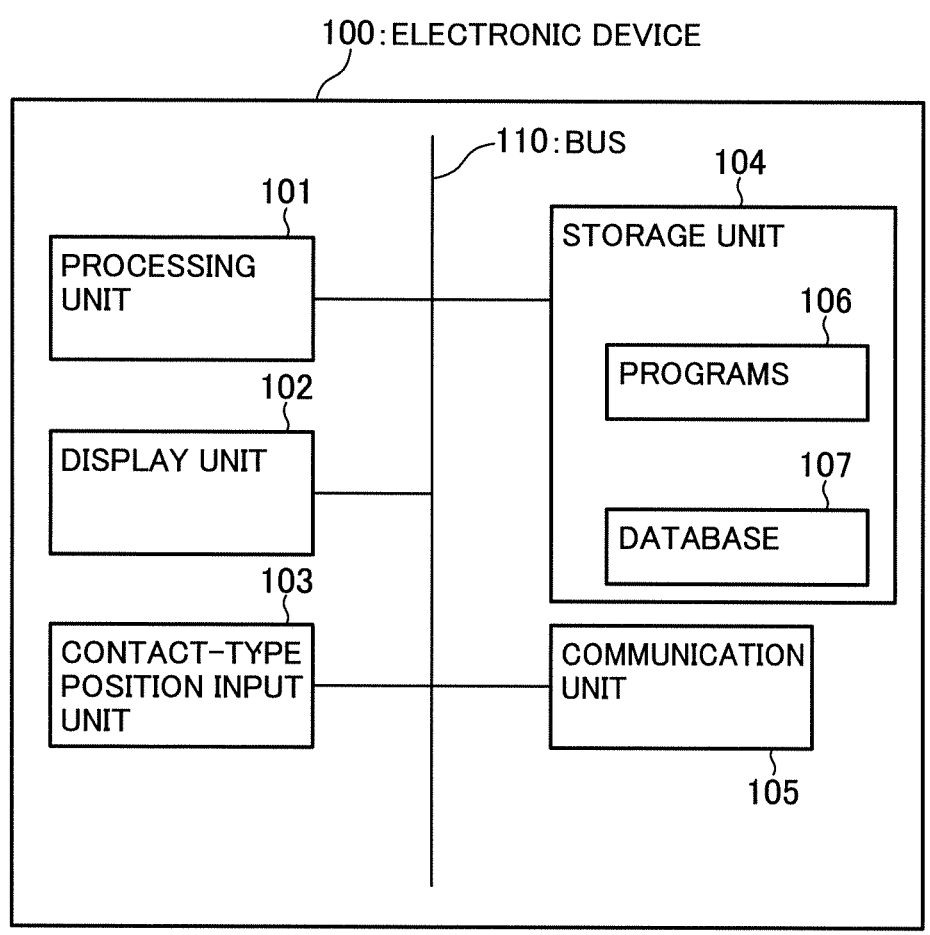
FIG. 1 shows the hardware configuration of an electronic device according to one embodiment of the present invention.

FIG. 1 is a block diagram showing the hardware configuration of an electronic device 100 according to an embodiment of the present invention. The electronic device 100 includes a processing unit 101, a display unit 102, a contact-type position input unit 103, a storage unit 104, and a communication unit 105. These components are connected to each other via a bus 110; alternatively, however, the components may be connected individually as needed.

The electronic device 100 is preferably a smartphone; however, it may be, for example, a tablet computer, a video game machine, a portable video game machine, or a computer equipped with a contact-type input device, such as a touchpad.

The processing unit 101 executes various kinds of processing, such as game processing and image generation processing, on the basis of data input from the contact-type position input unit 103 or data received from the communication unit 105. The processing unit 101 includes a processor that controls the components of the electronic device 100, and it executes various kinds of processing by using registers included in the processor or the storage unit 104 as a work area.

The storage unit 104 includes a hard disk, a main memory, and a buffer memory. The hard disk stores programs 106. However, any type of non-volatile storage that can store information may be used in place of the hard disk. The hard disk may also be of a removable type. For example, in the case where the electronic device 100 is a smartphone, the storage unit 104 includes a ROM and a RAM. The storage unit 104 stores the programs 106 and various kinds of data that can be referred to when the programs are executed. The programs may include an operating system or programs for all kinds of applications requiring user input, such as a video game and a Web browser. The various kinds of data include, for example, image data for displaying various kinds of images, such as objects, etc. that appear in a game, and coordinate data that can be written to the storage unit 104 during the game. Furthermore, the storage unit 104 includes a database 107 relating to history information of player's operations and frequency information of consecutively performed player's operations. Preferably, the database 107 includes an event-history-information database relating to event history information including information about events that were executed and an event-frequency-information database relating to event frequency information based on the event history information and representing the frequencies of occurrence of individual patterns of event sequences constituted of two or more consecutive events.

The communication unit 105 carries out wired communications using an Ethernet (registered trademark) cable or the like or wireless communications such as mobile communications or wireless LAN communications to connect to a network 101.

The display unit (display) 102 displays images that are output as the results of execution of the programs 106. The display unit 102 is preferably a liquid crystal display; alternatively, however, the display unit 102 may be an organic EL display, a plasma display, or the like.

The contact-type position input unit 103 provides the electronic device 100 with an input based on a position touched by a player, for example, like a touchpad. Preferably, the display unit 102 and the contact-type position input unit 103 are integrated as a touchscreen; alternatively, however, the display unit 102 and the contact-type position input unit 103 may be disposed at different positions as separate units. For example, in the case where the display unit 102 and the contact-type position input unit 103 are integrated as a touchscreen, an input based on a player's touch on the display unit 102 is accepted, and the contact-type position input unit 103 detects the coordinates corresponding to the position touched by the player and supplies the coordinates to the electronic device 100. Although any detection method, such as a capacitive detection method for a touchscreen, may be used, preferably, the contact-type position input unit 103 is of the type that can detect player's fingers or the like simultaneously touching two or more points and supply coordinate information corresponding to the individual detected positions to the electronic device 100.

Here, a touch refers to an operation or state in which a finger or the like contacts the contact-type position input unit 103, i.e., the touchscreen in this embodiment. Although it is assumed in the description of this embodiment that a touch by a player is made by using a finger of the player, any finger may be used for touching, or something else may be used, such as a stylus. Meanwhile, a release is an operation or state in which a finger or the like is apart from the touchscreen.

A player operates the electronic device 100 mainly by touching and releasing. Such touch operations may include touch, long touch, multi-touch, release, swipe, tap, double tap, long tap, drag, flick, etc. For example, a tap is an operation in which a release is performed following a touch without moving the touched position. Preferably, the processing unit 101 distinguishes among some or all of the kinds of touch operations on the basis of a contact, a contact position, a contact period, or the number of contacts on the touchscreen with a finger or the like.

Figure 2:
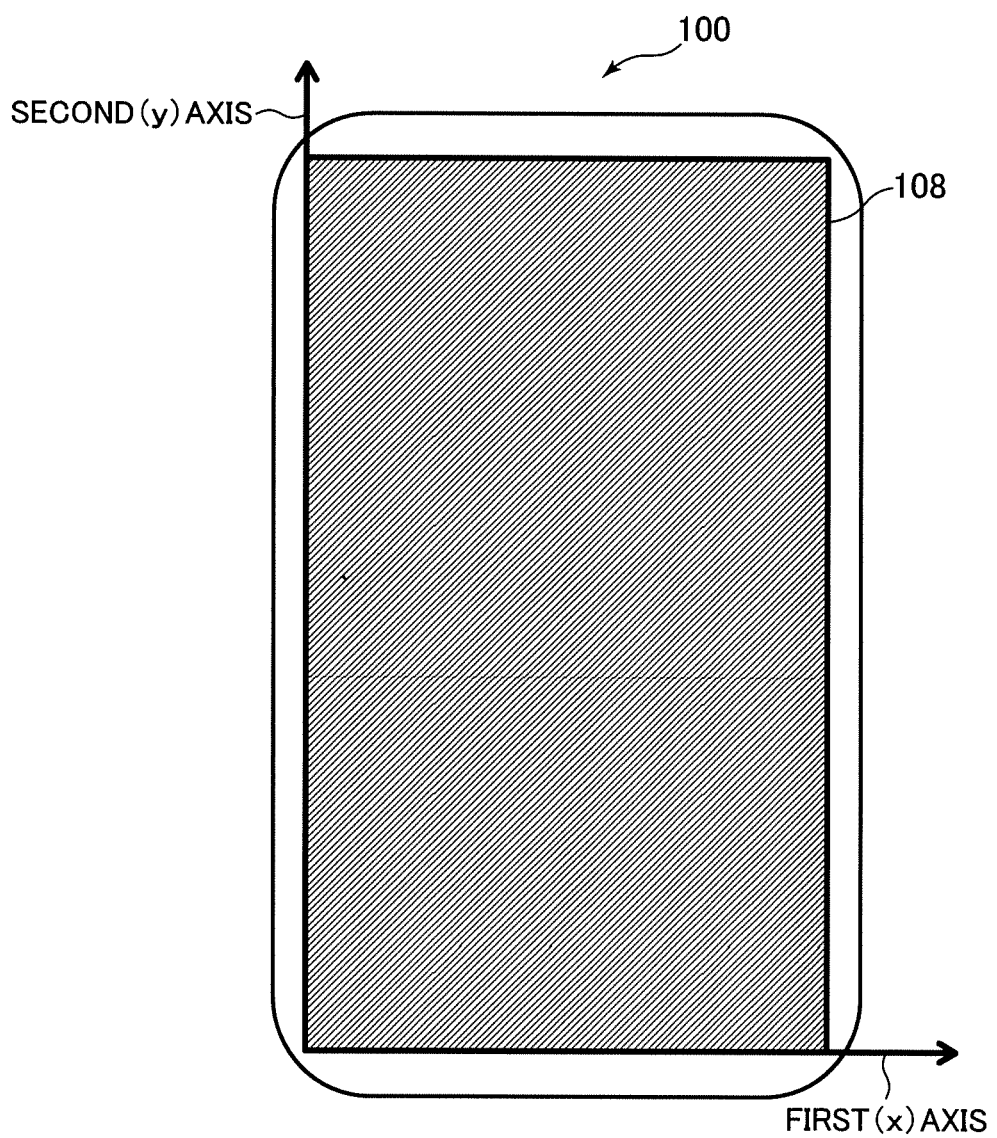
FIG. 2 is an illustration showing coordinate axes of the touchscreen of the electronic device according to one embodiment of the present invention.

For example, in the case where a smartphone is used as the electronic device 100, the display unit 102 and the contact-type position input unit 103 are integrated as a touchscreen 108. In the contact-type position input unit 103, a position is designated in the form of coordinates by using a coordinate plane defined by a first axis and a second axis substantially perpendicular to the first axis. Preferably, as shown in FIG. 2, the first axis is substantially parallel to the shorter sides of the touchscreen 108 (the contact-type position input unit 103), which has a substantially rectangular shape, the second axis is substantially parallel to the longer sides of the touchscreen 108, and a position is represented in the form of coordinates (x, y) based on a coordinate axis in the first axis direction (horizontal axis) and a coordinate axis in the second axis direction (vertical axis). The processing unit 101 can obtain, by using a program or the like, a touched position detected by the touchscreen 108 in the form of data of such coordinates (x, y). For example, in the case where the detection precision of the touchscreen 108 is 640 dots× 1136 dots, a resolution of 640 dots in the horizontal axis direction and 1136 dots in the vertical axis direction can be attained. In this case, each dot may be either a single point or a certain region (cell). Note, however, that the distance between dots usually varies among touchscreens (electronic devices). In this description, the term "distance" should be construed to mean a distance in coordinates unless explicitly mentioned otherwise. The setting of coordinates shown in FIG. 2 is an example, and coordinate axes can also be set by a program. Alternatively, polar coordinates can be set, and other kinds of coordinate system can be set through coordinate transformation.

As another example, in the case where the display unit 102 and the contact-type position input unit 103 are disposed at different positions as separate units, it is possible to set coordinates as described above in the contact-type position input unit 103, while setting coordinates corresponding to the coordinates for the contact-type position input unit 103 in the display unit 102.

Figure 3:
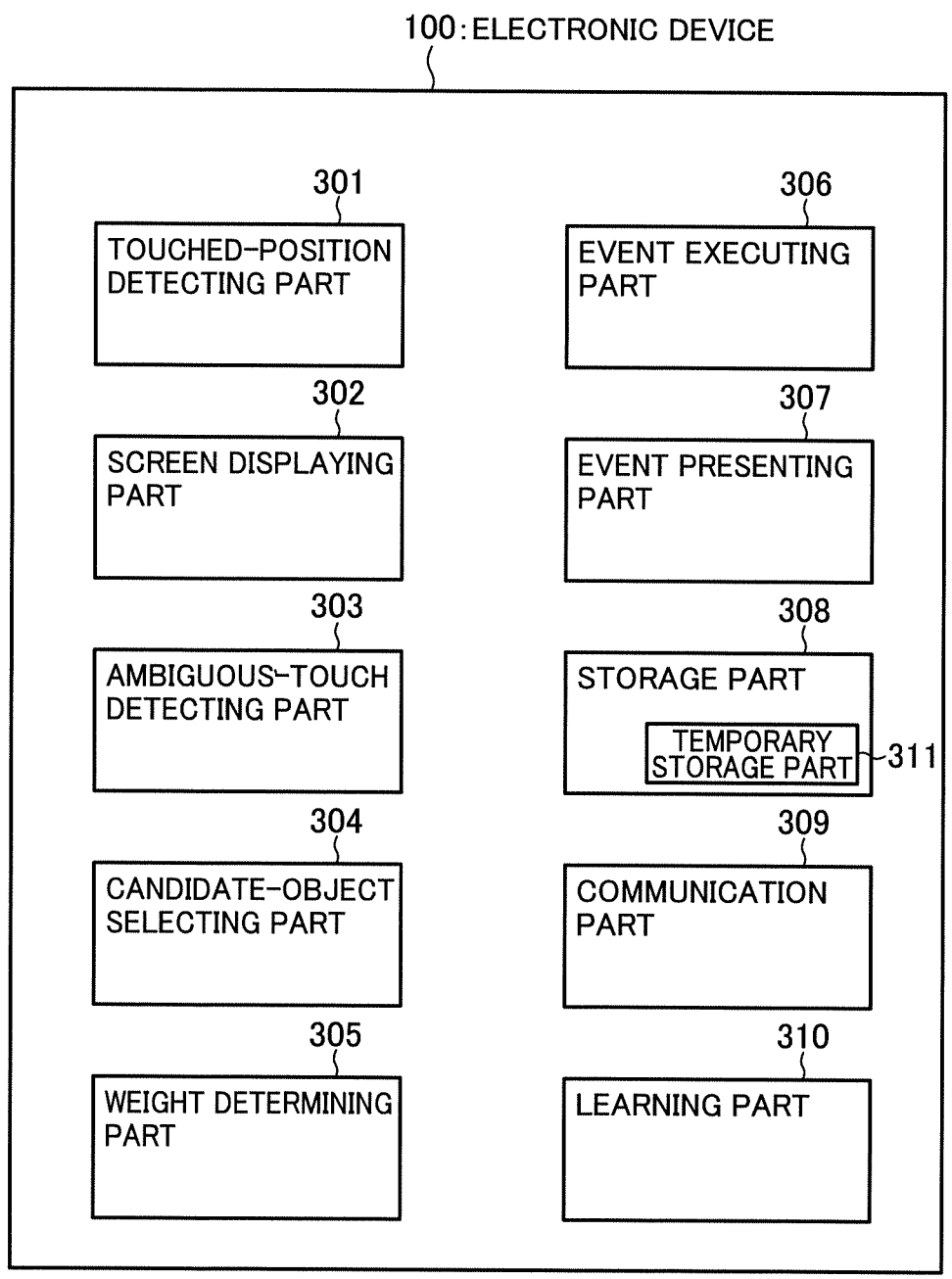
FIG. 3 is a functional block diagram of the electronic device according to one embodiment of the present invention.

FIG. 3 shows an example of the functional block diagram of an electronic device according to the present invention. The electronic device 100 includes a touched-position detecting part 301, a screen displaying part 302, an ambiguous-touch detecting part 303, a candidate-object selecting part 304, a weight determining part 305, an event executing part 306, an event presenting part 307, a storage part 308, a communication part 309, a learning part 310, and a temporary storage part 311.

The touched-position detecting part 301 has a function for detecting a position touched by a player on the contact-type position position input unit 103 and supplying the position to the electronic device 100. The screen displaying part 302 has a function for displaying an output from the electronic device 100 on the display unit 102 so that objects associated with events can be displayed on the display unit 102.

The ambiguous-touch detecting part 303 has a function for detecting a detected touch as an ambiguous touch in the case where it is not possible to uniquely determine a single object on the basis of the touched position of the detected touch. For example, the ambiguous-touch detecting part 303 can detect a detected touch as an ambiguous touch in the case where there are two or more objects within a certain distance of the detected touched position.

The candidate-object selecting part 304 has a function for selecting candidate objects, which are objects that the player may have intended to touch, on the basis of the touched position of the touch detected as an ambiguous touch.

The weight determining part 305 has a function for determining weights relating to the occurrence of the individual candidate events on the basis of candidate events associated with the candidate objects, an event or an event sequence (two or more consecutive events) executed immediately before, and event history information including information about events that were executed. For example, the weights relating to the occurrence may be scores representing the possibilities of occurrence or may be priorities relating to occurrence.

The event executing part 306 has a function for executing an event associated with an object in the case where it is possible to determine the single object on the basis of the detected touched position or a candidate event having the highest weight. Meanwhile, the event presenting part 307 has a function for presenting the player with confirmations for execution of candidate events in descending order of their weights.

The storage part 308 has a function for storing programs, data, etc. in the storage unit 104. The temporary storage part 311 included in the storage part 308 has a buffering function for temporarily accumulating data, and it accumulates an execution history of events associated with objects in a buffer. Thus, in the case where an ambiguous touch has been detected, the temporary storage part 311 is in a state where event history information until immediately before the detection of the ambiguous touch has been accumulated. Preferably, the storage part 308 regularly accumulates the history information accumulated in the buffer in the event-history-information database as event history information. Furthermore, the storage unit 308 aggregates the frequencies of occurrence of individual patterns of event sequences constituted of two or more consecutive events on the basis of the event history information and stores event frequency information representing the frequency of occurrence in the event-frequency-information database. The weight determining part 305 can obtain the event history information or event frequency information needed for determining weights by querying the database 107 by using the event history information accumulated in the buffer as a query. In this embodiment, the event history information and the event frequency information should preferably be stored individually in separate databases. However, since the event frequency information is information that is created on the basis of the event history information, the event history information can be construed as a constituent element having a broad concept encompassing the event frequency information. Note that the event frequency information may be created while taking into account some other information as well as the event history information in consideration of the kind, nature, etc. of the game for which the present invention is implemented. The event frequency information is not necessarily information that is created from the event history information alone.

The communication part 309 has a function for carrying out wireless communications and wired communications. The storage part 308 can obtain a program or data from a server, an optical disk, etc. via the communication part 309 and store the program or data therein.

The learning part 310 has a function for learning player's operations. Specifically, the learning part 310 can improve the precision of action prediction of player's operations by changing the frequency information of consecutive operations, stored in the database 107, on the basis of operation history information obtained from a player.

These functions of the electronic device 100 are realized by executing the programs 106. Thus, part of the function of one part may be provided in another part. Note that some of these functions may also be realized by configuring electronic circuits or the like.

The operation of the present invention, in one embodiment of the present invention, will be described. In this embodiment, a smartphone is used as the electronic device 100, and in a game that is executed by the smartphone, control is executed for an ambiguous touch performed by a player, with which it is not possible to uniquely determine an object. Taps are mainly assumed as touch operations in the flow.

Figure 5A:
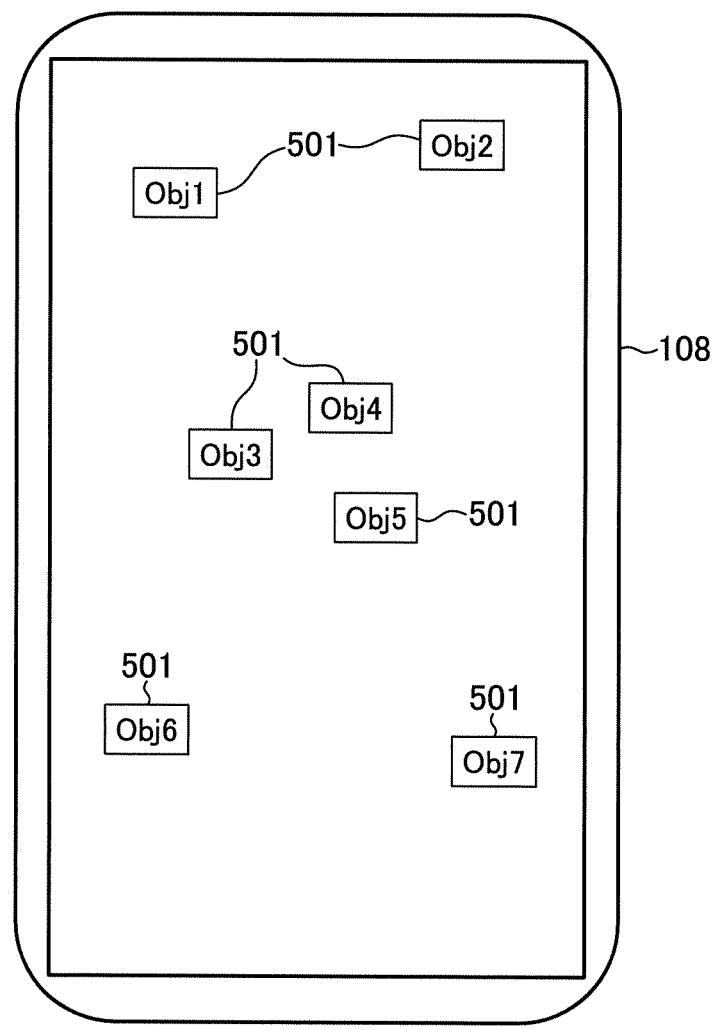
FIG. 5a is in illustration showing a game screen according to one embodiment of the present invention.

FIG. 4 is a flowchart showing information processing according to one embodiment of the present invention. At the start of the flow, the smartphone is in a state where a game program is being executed and the user is playing the game. In step 401, the smartphone displays a screen including objects associated with events. FIG. 5a shows an example of the game screen displayed on the touchscreen 108. Objects (Obj1 to Obj7) 501 displayed in FIG. 5a are objects associated with events. When an object is selected by a touch performed by the player, predetermined game processing or control associated with that object is executed. For example, in the case where each object displayed is an item, the player can select an item corresponding to each object by selecting the object with a touch. In this phase, the smartphone waits for a touch on the touchscreen by the player (step 402).

Figure 5B:
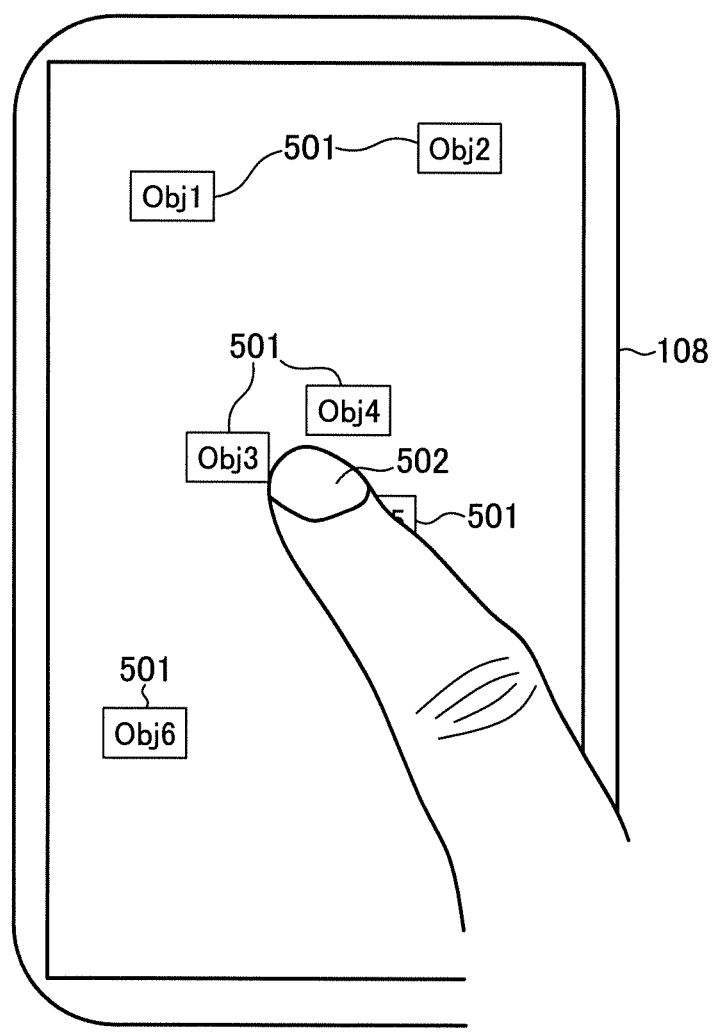
FIG. 5b is an illustration showing a state where the game screen has been touched, according to one embodiment of the present invention.

FIG. 5b shows a state where the touchscreen has been touched by a finger of the player. A touch on the touchscreen is determined in step 402, and the touched position is detected in the form of coordinates in the case where it is determined that the touchscreen is being touched (step 403).

In this embodiment, a smartphone is used as the electronic device 100. Generally, a smartphone performs touch detection at regular intervals of time and updates the screen at regular intervals of time. For example, the unit time for updating the screen may be 1/30 seconds, 1/60 seconds, 1/120 seconds, etc. In this flowchart, preferably, touch detection is performed in synchronization with the screen updating period. The detected touched-position coordinates are stored in the storage unit either temporarily or until the end of the processing according to the flow unless specifically mentioned otherwise. Furthermore, the coordinate range of objects that is recognized by the program is also updated in synchronization with screen updating.

Figure 5C:
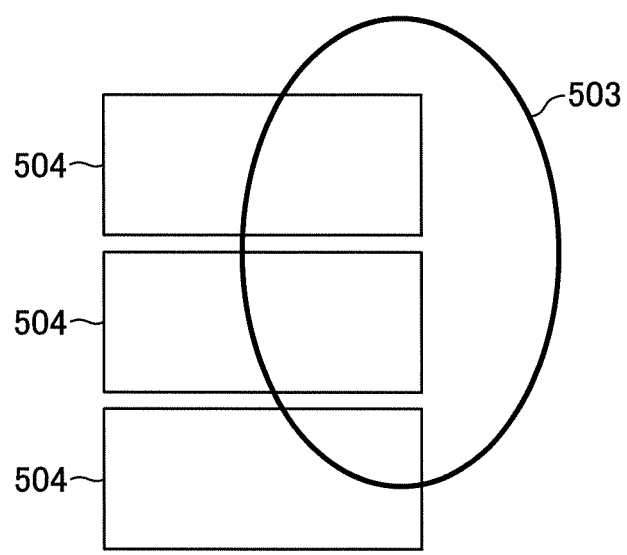
FIG. 5c is an illustration showing an area that can be touched with a human finger.

Then, in step 404, it is determined whether or not the detected touch is an ambiguous touch. Here, an ambiguous touch refers to a touch with which it is not possible to uniquely determine the player's intent. FIG. 5c shows an area 503 that can be touched with a human finger 502. As shown in the figure, with a touch, a finger contacts a plurality of areas 504 that can be touched on the screen. As described earlier, the touched position is detected in accordance with the detection resolution of the touchscreen. Since it would often be counterintuitive for users if one of the plurality of points at which the finger was in contact with the screen were used for the identification of the touched point, generally, smartphone operating systems estimate the actual position of the finger and use the position as the touched position. However, in the case where the assumed range of the finger or the estimated touched position falls on the areas of a plurality of objects, it is not possible to uniquely determine the touched object. Thus, in such cases, it is determined that the detected touch is an ambiguous touch.

Figure 5D:
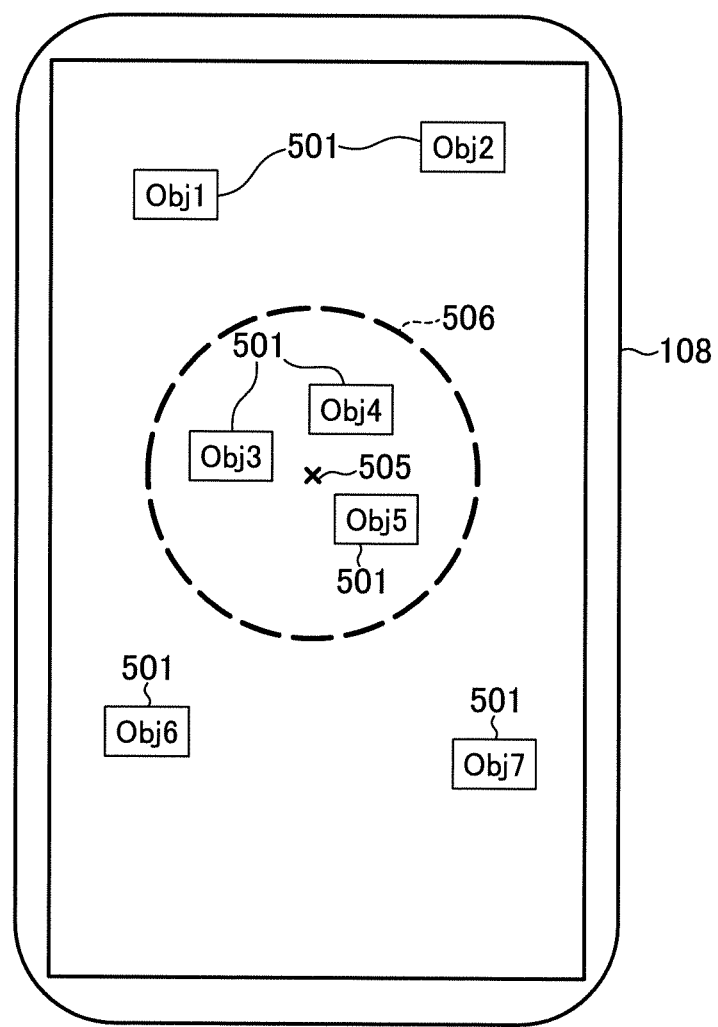
FIG. 5d is an illustration showing a method of detecting an ambiguous touch in the game screen according to one embodiment of the present invention.

FIG. 5d shows a method of detecting an ambiguous touch according to one embodiment. A touched position 505 in FIG. 5d indicates a touched position detected on the basis of the center position of the touching finger. The smartphone detects objects located within a predetermined distance 506 from the touched position and detects an ambiguous touch in the case where two or more objects are detected. Here, the predetermined distance represents a distance on the coordinates of the touchscreen, indicating an assumed range of the touch performed by the player from the detected touched position. In the case where two or more objects are detected, it is not possible to determine which object the player intended to touch. Thus, in the case where two or more objects are located within the predetermined distance from the touched position, the detected touch is detected as an ambiguous touch. The predetermined distance may be set to be different values in accordance with the detection precisions and sizes of touchscreens.

In the case where an ambiguous touch is not detected, the processing proceeds to step 405. In the case where no object is detected, the processing is terminated immediately. In the case where one object is detected, event processing associated with that object is executed (step 414). Note that step 405 may be executed simultaneously with step 404 since objects located within the predetermined distance from the touched position are detected in step 404, in which an ambiguous touch is detected.

When an ambiguous touch is detected, the detected candidate objects are selected in step 406. As shown in FIG. 5d, Obj3, Obj4, and Obj5, which are located within the predetermined distance from the touched position, are selected as candidate objects. By narrowing down candidate objects in this manner, it is possible to reduce the time needed for the subsequent information processing.

Then, in step 407, weights relating to the occurrence of individual candidate events, which are events associated with the individual selected candidate objects, are determined. For example, in the case where the weights relating to the occurrence are scores representing the possibilities of occurrence, scores for the individual candidate events are calculated as the weights relating to the occurrence of the individual candidate events. The scores are calculated on the basis of the player's operation history and frequency information of the operation history and numerically represent the possibilities of occurrence of the individual candidate events.

In this flowchart, the scores are calculated. Specifically, the scores for the individual candidate events are calculated on the basis of the candidate events, an event or a sequence of events executed immediately before, and event history information including information about executed events.

Figure 6A:
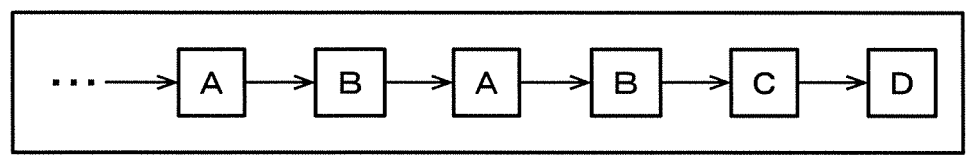
FIG. 6a shows a player's operation history according to one embodiment of the present invention.

In this embodiment, an operation history of the player is stored, as shown in FIG. 6a. The operation history that is stored is a history of events associated with objects. The temporary storage part 311 accumulates an execution history of events associated with objects, representing an operation history of the player, as event history information in a buffer, and the storage part 308 stores the accumulated data in the event history database. Preferably, the storage part 308 stores regularly accumulated data in the event history database. The storage part 308 aggregates the frequencies of occurrence of individual patterns of event sequences constituted of two or more consecutive events from the event history information and stores event frequency information representing the frequency of occurrence in the event-frequency-information database. Note, however, that since the events involved in the player's operation history are associated with objects, the events may be considered as having concepts equivalent to the objects themselves. Thus, for example, the operation history that is stored, shown in FIG. 6*a*, may be a history of objects. The storage part 308 may be configured not to store the event history information accumulated in the buffer in the event-history-information database. In this case, event history information that is obtained in advance is stored in the event-history-information database.

In calculating the scores, the event-frequency-information database is queried by using, as queries, event sequences in which the candidate events are added to a part of or the entire event history information accumulated in the buffer.

Step 407 includes processing as a whole for an action prediction method based on the past operation history or frequency information of the past operation history of the player. As one embodiment thereof, a score calculating method based on n-grams will be described.

Figure 6B:
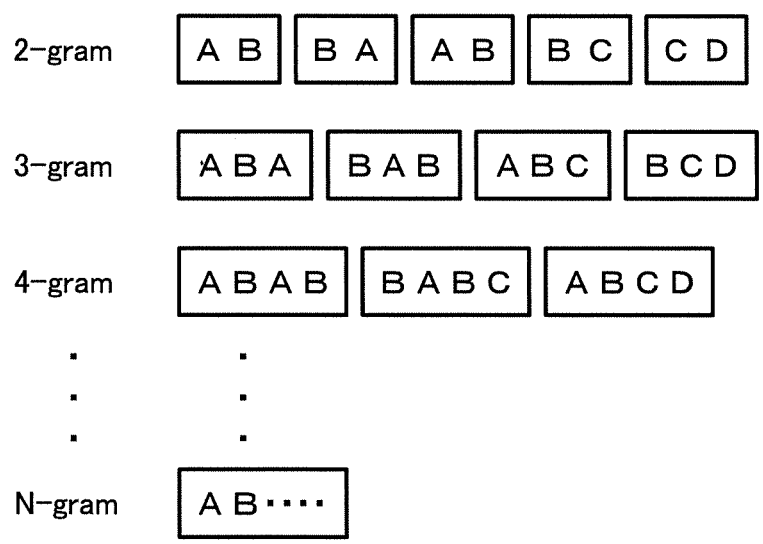
FIG. 6b shows a state where the player's operation history has been divided into combinations of N consecutive elements, according to one embodiment of the present invention.
Figures 6C, 7:
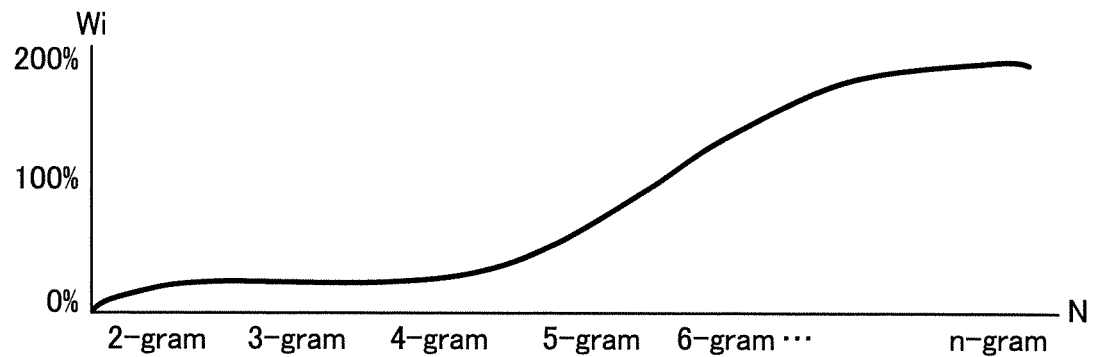
FIG. 6c shows a state where the frequencies of occurrence of the individual combinations of N consecutive elements in the player's operation history have been aggregated and indices have been created, according to one embodiment of the present invention.
FIG. 7 shows an example of a wi function used in a score function, according to one embodiment of the present invention.

First, the data that is stored in the database 107 as event frequency information will be described. As a model for predicting the next touch operation based on event logs of the immediately preceding (N−1) touches by a player, indices for accumulating operation frequency information are created in accordance with the numbers of operations to be traced back in order to analyze concatenations among the event logs, like one log before (N=2), two logs before (N=3), and three logs before (N=4). As described earlier, the player's operation history is stored as shown in FIG. 6*a*. In the example in FIG. 6*a*, it is recorded that the player performed operations in the order A→B→A→B→C→D. In the n-gram model, as shown in FIG. 6*b*, this operation history is divided into N consecutive combinations (event sequences), like 2-grams, 3-grams, 4-grams, and so forth, and the frequencies of occurrence of the individual combinations are aggregated. For example, in the case of 2-grams, the operation history A→B→A→B→C→D is divided into five kinds of combinations of two elements AB, BA, AB, BC, and CD, and the occurrence of these combinations is added individually to the corresponding frequency information. In the case of 3-grams, the operation history A→B→A→B→C→D is divided into four kinds of combinations of three elements ABA, BAB, ABC, and BCD, and the occurrence of these combinations is added individually to the corresponding frequency information. By dividing the history of N consecutive operations and calculating the frequencies of occurrence in this manner, it is possible to create indices in which a combination having a high frequency of occurrence indicates a combination of operations frequently used by the player, as shown in FIG. 6*c*. For example, the data structure H of the indices shown in FIG. 6*c* is as follows:

H:={<ngram1, frequency1>, <ngram2, frequency2>, . . . , <ngramk, frequencyk>}

Here, ngramk signifies the k-th kind of n-gram, and frequency k signifies the value of the frequency of occurrence associated therewith.

Next, the method of comparing against the event frequency information will be described. A method of calculating scores in the case where candidate objects X, Y, and Z are selected will be described. First, n-gram keys in which the individual candidate objects are added to the tail are generated. In the case where the player has performed operations in the order A→B→A→B→C→D, as shown in FIG. 6*a*, the following n-grams are generated from the candidate objects X, Y, and Z:

For the candidate object X, combinations are generated repeatedly until reaching a combination of N elements, like DX (2-gram), CDX (3-gram), BCDX (4-gram), and so forth.

For the candidate object Y, combinations are generated repeatedly until reaching a combination of N elements, like DY (2-gram), CDY (3-gram), BCDY (4-gram), and so forth.

For the candidate object Z, combinations are generated repeatedly until reaching a combination of N elements, like DZ (2-gram), CDZ (3-gram), BCDZ (4-gram), and so forth.

The present system compares the generated n-grams as queries against all the frequency information accumulated in the history database and assigns a higher score to a candidate object as the frequency of occurrence becomes higher and the value of n of the n-gram increases. A function score for calculating a score according to one embodiment is expressed in equation (1).

[Eq. 1]

$$\mathrm{score}(p,x,H)=\rho_{i=2}^{n}(w_i\cdot\mathrm{freq}(H,Q))|Q\leftarrow\mathrm{query}(p,i,x) \quad (1)$$

Here, p signifies a sequence of the immediately preceding (N−1) touch operations that have already been entered by the player, x signifies a candidate object, and H signifies a database of all the frequency information accumulated so far. The function score uses two internal functions. One is query(p, i, x). With this function Q (query(p, i, x)), (n−1) elements are picked up from the tail of the sequence of (N−1) immediately preceding touch operations that have already been entered by the player, and x is added to the tail of those elements to generate a new combination. With this function, it is possible to generate n-grams that serve as queries, as described earlier. The second function is freq(H, Q). This is a function for calculating the frequency of occurrence of a query generated by the query( ) function in the frequency information database. Furthermore, in this embodiment, preferably, a match with a longer combination (event sequence) is considered as matching the player's intent more clearly, and a greater coefficient is applied as the value of n of the index increases. This coefficient is wi in the equation. Since i is a variable that increases from 2 to N, it is possible to implement wi as a function with which the degree of reflection on the score becomes stronger as the value of i increases. For example, a function with which wi is increased non-linearly as i increases may be adopted, as shown in FIG. 7.

Referring back to the flowchart shown in FIG. 4, it is determined whether or not the highest score among the scores of the individual candidate events, determined in step 407, is greater than or equal to a predetermined threshold (step 408). In this step, it may be determined directly whether or not the score of each of the candidate events is greater than or equal to the predetermined threshold. Since the threshold is a value used in relation to the scores calculated for the determination of the player's action prediction with high confidence, the scores of two or more candidate events do not become greater than or equal to the threshold. In the case where the score is greater than or equal to the predetermined threshold, before executing the candidate event having the score, a screen for accepting cancellation of the execution of the candidate event by the player is displayed (step 409). The cancellation accepting screen is displayed for a predetermined period, and in the case where a touch at the coordinates corresponding to a cancellation button is not detected within the predetermined period (step 410), event processing is executed (step 414). In the case where the score is less than the predetermined threshold in step 408 or in the case where a touch at the coordinates corresponding to the cancellation button is detected within the predetermined period in step 410, a screen showing a list of the candidate objects arranged in descending order of their scores is displayed (step 411) to let the player select one of the candidate objects (step 412). In the case where one of the candidate objects is selected, the player's action history is learned in relation to the candidate event associated with the selected candidate object (step 413), and event processing is executed (step 414). In the case where no candidate object is selected in step 412, the processing is terminated immediately.

With the learning of the player's action history in step 413, it is possible to perform learning so as to change the relevant frequency information in the case where a touch at the coordinates corresponding to the cancellation button is detected within the predetermined period in step 410. Note that step 413 may be omitted.

After executing the event processing in step 414, in step 415, as the latest history information in the player's operation history shown in FIG. 6a, the candidate event having the highest score or the candidate event associated with the candidate object selected in step 412 is accumulated in the buffer. Furthermore, it is possible to delete only history information for which a certain period has elapsed or to delete excess history information from old history information in the case where more than a certain number of pieces of history information have been accumulated in the buffer.

As a modified embodiment of the flowchart in FIG. 4, instead of steps 408 to 413, after determining the scores of the candidate events in step 407, the candidate event having the highest score among the determined scores of the individual candidate events may be determined, and processing for the candidate event may be executed directly in step 414.

Figure 8:
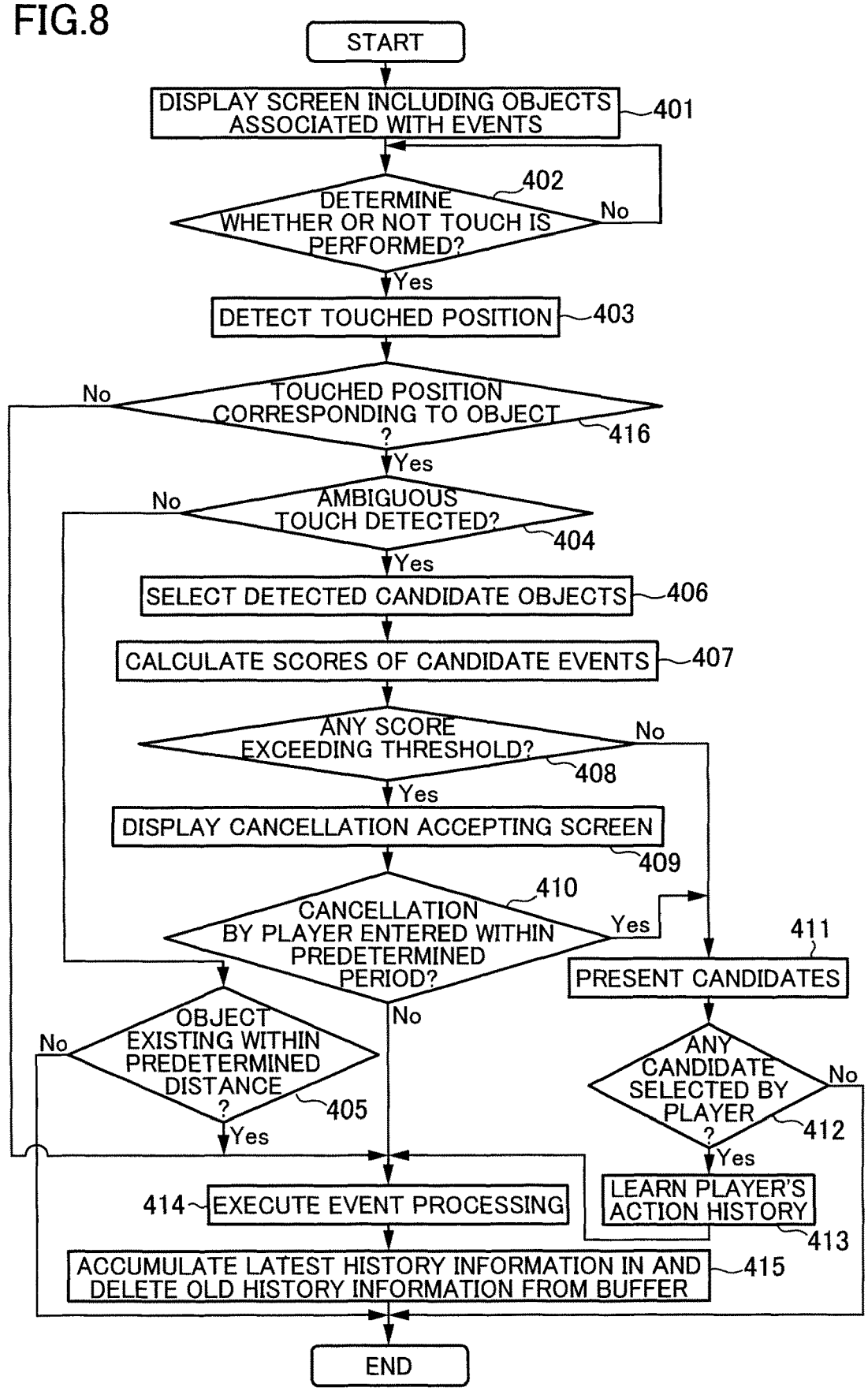
FIG. 8 is a flowchart showing information processing according to another embodiment of the present invention.

FIG. 8 is a flowchart showing information processing according to another embodiment of the present invention. As shown in FIG. 8, this flowchart is the same as the flowchart in FIG. 4 except in that step 416 is executed. In this flowchart, after detecting the touched position in step 403, it is determined whether or not it is possible to uniquely determine an object with the detected touch. That is, it is determined whether or not the detected touched position is a position corresponding to only the coordinate range of a single object. In the case where the detected touched position is a position corresponding to only a single object, the processing proceeds to step 414, in which event processing corresponding to that object is executed. In the case where the detected touched position does not fall within the coordinate range of a single object, similarly to FIG. 4, the processing proceeds to step 404, in which it is determined whether the touch is an ambiguous touch.

The information processing shown in the flowchart in FIG. 4 is effective in the case where a player touches a screen in which objects are densely disposed in that the detection of an ambiguous touch is performed immediately after detecting a touch and prediction and correction of a touch operation are performed. Meanwhile, the information processing shown in the flowchart in FIG. 8 is effective for enabling object selection before performing the detection of an ambiguous touch in the case where a single object has clearly been selected in that the only object corresponding to the touched position is confirmed immediately after detecting a touch.

Embodiment Implemented by a System

Figure 9:
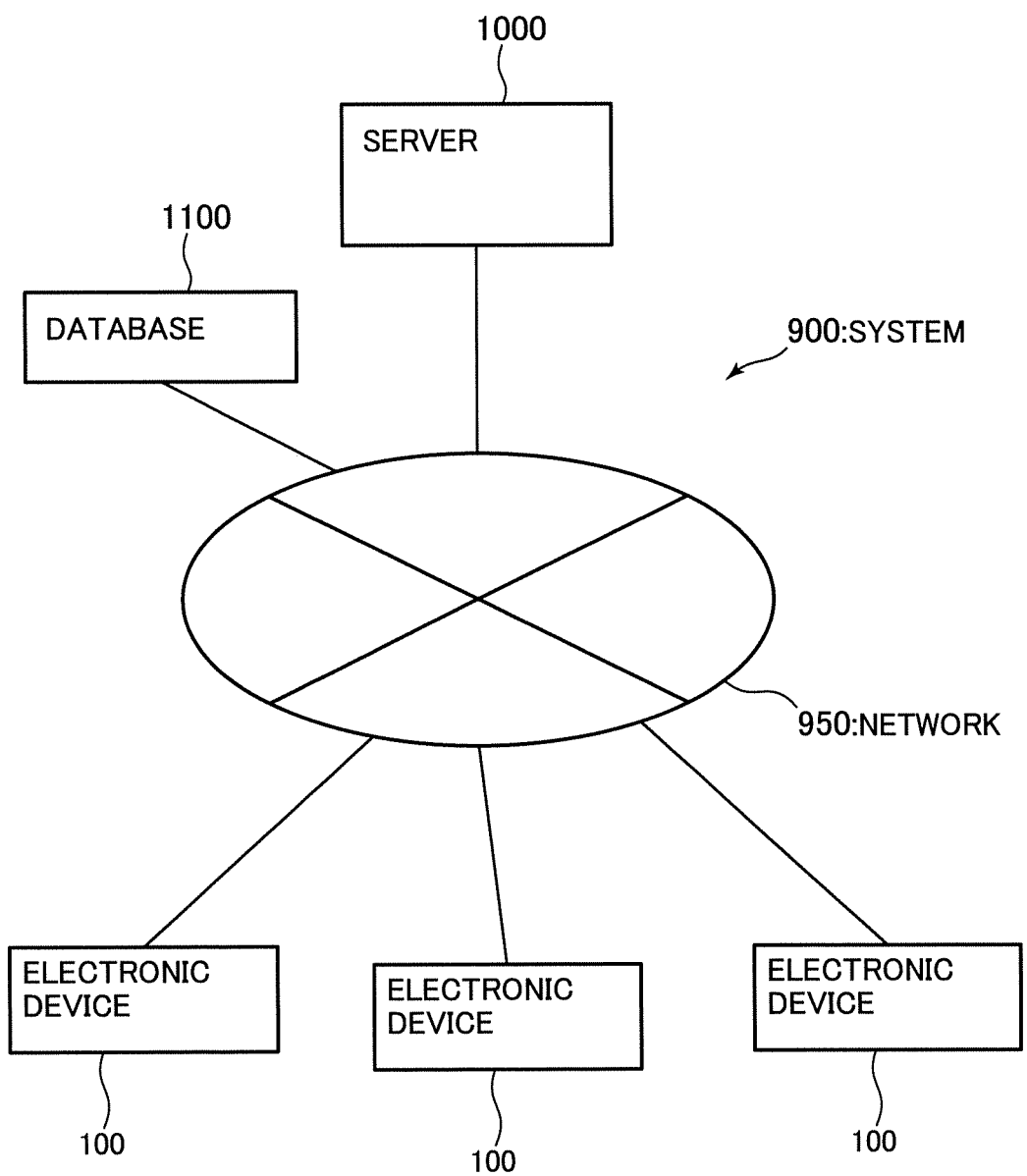
FIG. 9 shows an example of the overall configuration of a system according to an embodiment of the present invention.

FIG. 9 shows an example of the overall configuration of a system according to an embodiment of the present invention. A system 900 is configured to include a plurality of electronic devices 100 and a server 1000. These components are connected to each other via a network 950; alternatively, however, the components may be connected individually as needed. Also, in the case where one of the plurality of electronic devices also functions as a server, the system 900 may be configured not to include the server 1000. Furthermore, the system 900 may also include a database 1100. In the case where the system 900 includes the database 1100, the database 1100 stores history information of players' operations and frequency information of consecutively performed players' operations, and the electronic devices 100 or the server 1000 can obtain desired data by querying the database 1100. Although the use of a database in the server 1000 is mainly assumed in the following description, the description similarly applies to the case where the database 1100 directly connected to a network is used.

Figure 10:
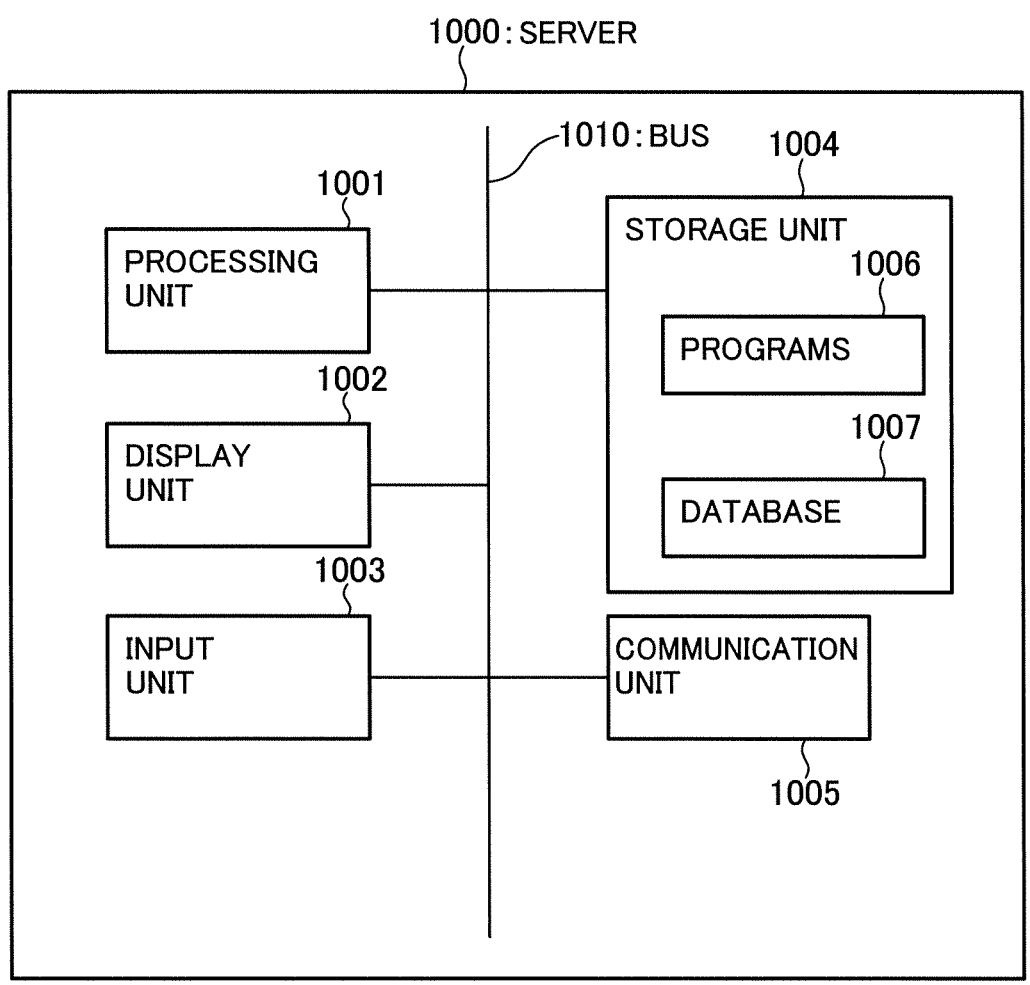
FIG. 10 shows the hardware configuration of a server according to an embodiment of the present invention.

FIG. 10 is a block diagram showing the hardware configuration of the server 1000 according to an embodiment of the present invention. The server 1000 includes a processing unit 1001, a display unit 1002, an input unit 1003, a storage unit 1004, and a communication unit 1005. These components are connected to each other via a bus 1010; alternatively, however, the components may be connected individually as needed.

The processing unit 1001 includes a processor that controls the components of the server 1000, and it executes various kinds of processing by using the storage unit 1004 as a work area. The display unit 1002 has a function for displaying information to a user. The input unit 1003 has a function for accepting inputs from the user, like a keyboard and a mouse.

The storage unit 1004 includes a hard disk, a main memory, and a buffer memory. The hard disk stores programs 1006. However, any type of non-volatile storage that can store information may be used in place of the hard disk. The hard disk may also be of a removable type. The storage unit 1004 stores the programs 1006 and various kinds of data that can be referred to when the programs are executed. Furthermore, the storage unit 1004 may include a database 1007 relating to history information of player's operations and frequency information of consecutively performed player's operations. In this case, the database 1007 preferably includes an event-history-information database relating to event history information including information about events that were executed and an event-frequency-information database relating to event frequency information based on the event history information and representing the frequencies of occurrence of individual patterns of event sequences constituted of two or more consecutive events. The communication unit 1005 carries out wired communications using an Ethernet (registered trademark) cable or the like or wireless communications such as mobile communications or wireless LAN communications to connect to the network 950.

For example, the server 1000 is an information processing device that is used by a system administrator or the like when running and managing a game service. The server 1000, upon receiving various commands (requests) from the electronic device 100, can distribute (send as responses) a game program that can run on the electronic device 100, a Web page created in a markup language compatible with the standards for the electronic device 100 or a game screen, etc. Furthermore, the server 1000 is a game server including a database and can output data in response to a query from the electronic device 100.

The various functions of the server 1000 are realized by executing the programs 1006; alternatively, however, some of the functions may also be realized by configuring electronic circuits or the like.

The hardware configuration of the electronic device 100 is shown in FIG. 1.

Figure 11:
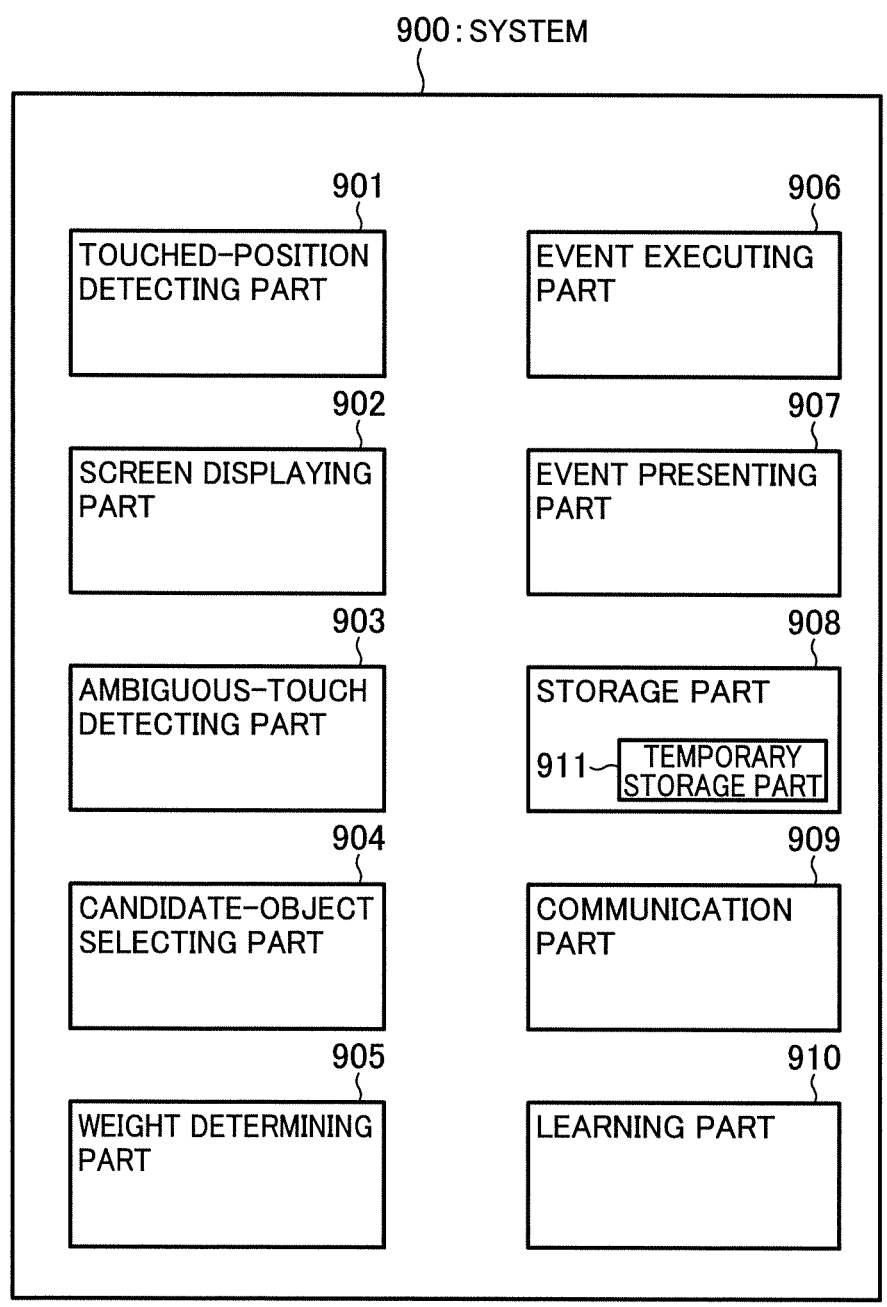
FIG. 11 is a functional block diagram of a system according to one embodiment of the present invention.

FIG. 11 shows an example of the functional block diagram of a system according to the present invention. The functions shown in FIG. 11 are equivalent to the functions shown in FIG. 3. The various functions of the system 900 shown in FIG. 11 can be realized by providing the electronic device 100 and/or the server 1000 with the various functions shown in FIG. 11. The following embodiment will be described in the context of the case where the electronic device 100 or the server 1000 includes the database 107 or the database 1007; however, as described earlier, the system 900 may include the database 1100 connected to the network, separately from the electronic device 100 or the server 1000. In this case, the electronic device 100 or the server 1000 can obtain data from the database 1100.

As a system according to one embodiment, the electronic device 100 includes a touched-position detecting part 901, a screen displaying part 902, an ambiguous-touch detecting part 903, a candidate-object selecting part 904, an event executing part 906, an event presenting part 907, a storage part 908, a communication part 909, a learning part 910, and a temporary storage part 911, and the server 1000 includes a weight determining part 905, the storage part 908, the communication part 909, and the learning part 910. In this embodiment, the use of the database 1007 is assumed, and the databases 107 and 1100 should preferably be omitted from the configuration. For example, the system 900 can execute the information processing shown in the flowchart in FIG. 4, and in this case, the electronic device 100 executes the steps other than step 407, and the server 1000 executes step 407. The server 1000 sends the scores calculated in step 407 to the electronic device 100, and the electronic device 100 can continuously execute the processing in and after step 408 by receiving the scores. Here, event history information representing a player's operation history is accumulated in the buffer of the electronic device 100 by the temporary storage part 911, and the electronic device 100 sends the accumulated data to the server 1000 by the communication part 909, preferably regularly, and the storage part 908 stores the received data in the event-history-information database of the database 1007. Furthermore, the storage part 908 can aggregate the frequencies of occurrence of individual patterns of event sequences constituted of two or more consecutive events from the event history information and store event frequency information representing the frequencies of occurrence in the event-frequency-information database of the database 1007. Furthermore, regarding the player's action history learned in step 413, the electronic device 100 sends information relating to a change in the relevant frequency information to the server 1000, and thus the server 1000 can use this information in determining weights.

As a system according to another embodiment, the electronic device 100 does not include the database 107 and has the functions other than the function of the database in the storage part 908, and the server 1000 includes the database 1007 and has the function of the storage part 908 and the communication part 909. For example, the system 900 can execute the information processing shown in the flowchart in FIG. 4, and in this case, the electronic device 100 executes all the steps. However, in step 407, the database 1007 is queried for event history information and/or event frequency information to obtain desired data for determining weights. The event history information representing a player's operation history is accumulated in the buffer of the electronic device 100 by the temporary storage part 911. The electronic device 100 sends the accumulated data to the server 1000 by the communication part 909, preferably regularly, and the storage part 908 stores the received data in the event-history-information database of the database 1007.

In the above embodiment of the system, the database 1100 or 1007 is connected to the plurality of electronic devices 100 via the network 950. Thus, the storage part 908 can store event history information representing an operation history of other players operating the other electronic devices as well as an operation history of the operating player in the database, aggregate event frequency information from the stored event history information, and store the event frequency information. In this case, the electronic device can be made to function as an action prediction engine that predicts the next operation of a player in general as well as the operating player.

Furthermore, as a further embodiment of the player's operation history, it is possible to finish learning when learning data of the player has been sufficiently accumulated and thus it has become possible to calculate a score exceeding the threshold in step 408 and to notify the player of the availability of this function with a message such as "Enable smart selection?" Accordingly, the player experiences touched position correction with a sufficient precision from the start and thus will be highly satisfied. Furthermore, in the initial stages of a game, since there are not many options in the first place, the need for automatically correcting an ambiguous touch according to this invention is low. In stages after the initial stages, when the game becomes complex, it is possible to prevent degradation in user experience attributable to the complexity.

Figure 12:
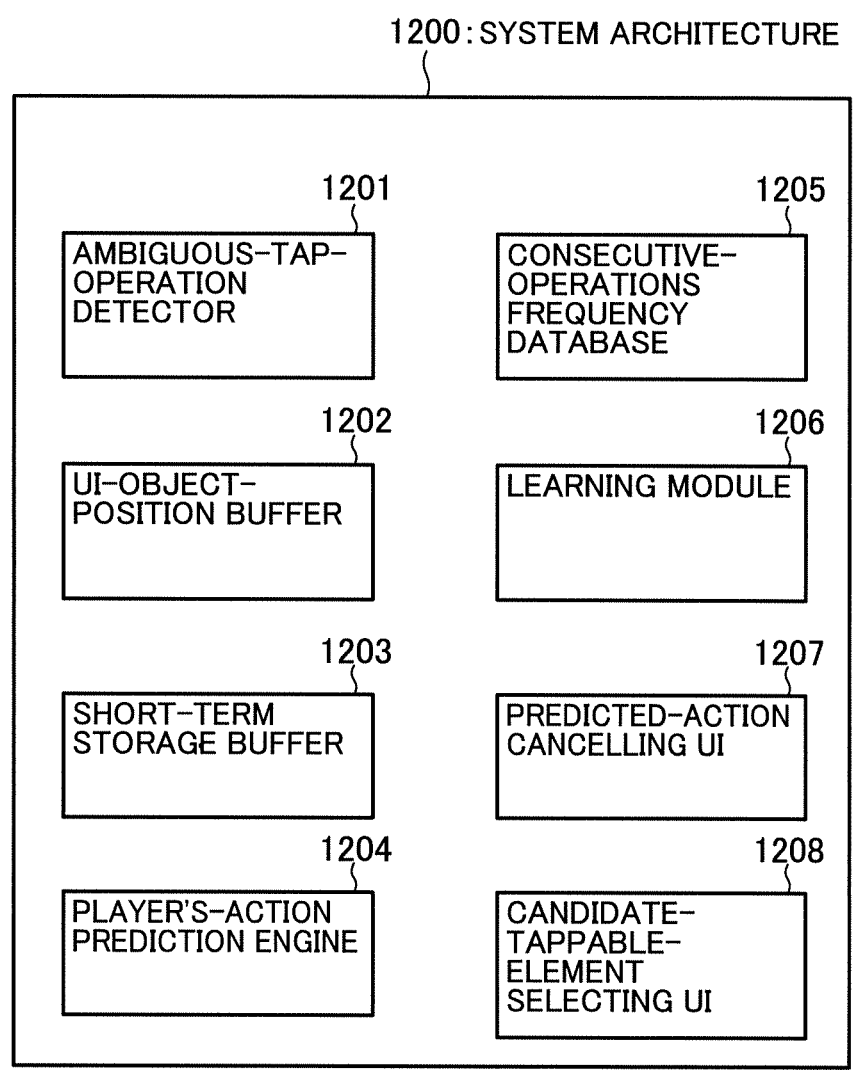
FIG. 12 shows the system architecture of a system according to one embodiment of the present invention.

As described earlier, the system according to this embodiment can be implemented either by a single electronic device or a system in which a plurality of electronic devices are connected via a network. The system has the functions shown in FIG. 3 or FIG. 11. A system architecture 1200 thereof according to one embodiment can be constituted of eight modules shown in FIG. 12. This modularization enables application to various kinds of game by modifying some of the modules.

An ambiguous-tap detector 1201 is a module that detects an ambiguous tap and is implemented as a part of a game system that runs on the electronic device 100. This module has a function corresponding to the ambiguous-touch detecting part 903. Since the ambiguity in a tapped position is strongly related to the nature of a game, this module should preferably be modified for each game title.

A UI-object-position buffer 1202 is a buffer that records the positions of UI objects displayed on a game screen. A short-term storage buffer 1203 is a buffer that records a history of immediately preceding (N−1) operations performed by the player. This module corresponds to the buffer included in the storage unit and has a function corresponding to a part of the storage part 908 or the temporary storage part 911, described earlier. The ambiguous-tap detector 1201 detects an ambiguous tap by using information obtained from the UI-object-position buffer 1202 and the short-term storage buffer 1203.

A player's action prediction engine 1204 is a software module that predicts the next action by the player and has a function corresponding to the weight determining part 905. Since this module uses a consecutive-operations frequency database 1205 in action prediction, which includes large-scale data, this module should preferably be implemented on the same device as the database.

The consecutive-operations frequency database 1205 is a database that stores frequency information of operations that were performed consecutively, corresponds to the database 1007, etc., and has a function corresponding to a part of the storage part 908. The present system is configured such that the operation history stored in the short-term storage buffer 1203 is regularly forwarded or sent to the consecutive-operations frequency database.

A learning module 1206 is a module that changes the frequency information of consecutive operations in the consecutive-operations frequency database 1205 by using feedback information from the player. This module has a function corresponding to the learning part 910. Although it is not essential to reflect this feedback information in implementing the present invention, it is possible to improve the precision of player's action prediction through learning using the feedback information. The feedback information can be obtained from a predicted-action cancelling UI 1207 or a candidate-tappable-element selecting UI 1208.

The predicted-action cancelling UI 1207 is a user interface for allowing the player to cancel a determined event when the system has predicted an action of the player with high confidence and automatically executes an event. This interface corresponds to a part having a function for executing steps 409 to 410 in the information processing in the flowchart shown in FIG. 4. When the player has cancelled an event via this UI, the present system performs learning so as to decrease the relevant frequency information by the learning module 1206.

The candidate-tappable-element selecting UI 1208 is a user interface for prompting reselection by the player when the confidence of the prediction of an action by the player is not sufficiently high, and has a function corresponding to the event presenting part. Specifically, it is conceivable to display neighboring tappable elements and to let the player select one of those elements.

In the processing or operation described above, the processing or operation can be modified freely as long as no inconsistency occurs in the processing or operation, such as an inconsistency that a certain step involves the use of data that could not yet be available in that step. Furthermore, the embodiments described above are examples for explaining the present invention, and the present invention is not limited to the embodiments. The present invention can be embodied in various forms as long as those forms do not depart from the gist thereof.

REFERENCE SIGNS LIST

100 Electronic device
101, 1001 Processing unit
102, 1002 Display unit
103 Contact-type position input unit
104, 1004 Storage unit
105, 1005 Communication unit
106, 1006 Programs
107, 1007 Database
108 Touchscreen
110 Bus
301, 901 Touched-position detecting part
302, 902 Screen displaying part
303, 903 Ambiguous-touch detecting part
304, 904 Candidate-object selecting part
305, 905 Weight determining part
306, 906 Event executing part
307, 907 Event presenting part
308, 908 Storage part
309, 909 Communication part
310, 910 Learning part
311, 911 Temporary storage part
501 Object
502 Finger
503, 504 Area
505 Touched position
506 Predetermined distance
900 System
950 Network
1000 Server
1003 Input unit
1100 Database
1200 System architecture
1201 Ambiguous-tap detector
1202 UI-object-position buffer
1203 Short-term storage buffer
1204 Player's-action prediction engine
1205 Consecutive-operations frequency database
1206 Learning module
1207 Predicted-action cancelling UI
1208 Candidate-tappable-element selecting UI

The invention claimed is:

1. A non-transitory computer readable medium storing a program executed on an electronic device that has a display unit and a contact-type position input unit and that detects a touched position corresponding to a touch on the contact-type position input unit by a player in the form of coordinates on the contact-type position input unit, the program causing the electronic device to execute:
    a step of displaying a screen including objects associated with events in a game on the display unit;
    a step of detecting, in the case where a touch on the contact-type position input unit is detected and two or more of the objects are located within a predetermined distance from the detected touched coordinates, the detected touch as being an ambiguous touch;
    a step of selecting candidate objects in the case where the ambiguous touch is detected, the candidate objects being the two or more objects located within the predetermined distance from the detected touched coordinates;
    a step of determining weights relating to an occurrence of candidate events in the game, the candidate events being events associated with the candidate objects in the game, on the basis of the candidate events, an event or a sequence of events executed immediately before in the game, and an operation history of the player within the game, the operation history including information about executed events in the game; and
    a step of executing, in the game, the candidate event having the highest weight or presenting the player with a confirmation for the execution of the candidate events having the highest weight.

2. The non-transitory computer readable medium according to claim 1,
    wherein the step of detecting the detected touch as being an ambiguous touch is:

a step that is executed in a case where the detected touched coordinates do not fall within a coordinate range corresponding to one of the objects, and wherein the program further causes the electronic device to execute:

a step of executing the event associated with the object in the case where the detected touched coordinates fall within the coordinate range corresponding to one of the objects.

3. The non-transitory computer readable medium according to claim 1, wherein the weights are determined based on event history information that includes event frequency information representing the frequencies of occurrence of individual patterns of event sequences constituted of two or more consecutive events in a history of executed events.

4. The non-transitory computer readable medium according to claim 3, wherein the event frequency information includes information representing the frequencies of occurrence of individual patterns of event sequences constituted of not more than N (N≥2) consecutive events, and wherein the step of determining weights includes:

a step of calculating scores representing the possibilities of occurrence of the individual candidate events on the basis of the frequencies of occurrence of sequences of n (2≤n≤N) consecutive events in the event frequency information, the sequences of n consecutive events being constituted of an event or a sequence of events executed immediately before the candidate events and the candidate events.

5. The non-transitory computer readable medium according to claim 4, wherein the step of calculating scores includes:

a step of calculating the scores for each of the candidate events with individual values of n=n1 to n2 (2≤n1<n2≤N), multiplying the calculated scores by predetermined coefficients corresponding to the magnitudes of the values of n, and adding the results together.

6. The non-transitory computer readable medium according to claim 1, wherein the program further causes the electronic device to execute:

a step of storing executed events.

7. The non-transitory computer readable medium according to claim 1, wherein the electronic device is connected to a server via a network, and wherein the program further causes the electronic device to execute:

a step of receiving event history information from the server; and a step of sending information including executed events to the server in order to store the executed events at the server.

8. A non-transitory computer readable medium storing a program executed on an electronic device that is connected to a server via a network, that has a display unit and a contact-type position input unit, and that detects a touched position corresponding to a touch on the contact-type position input unit by a player in the form of coordinates on the contact-type position input unit, the program causing the electronic device to execute:

a step of displaying a screen including objects associated with events in a game on the display unit;

a step of detecting, in the case where a touch on the contact-type position input unit is detected and two or more of the objects are located within a predetermined distance from the detected touched coordinates, the detected touch as being an ambiguous touch;

a step of selecting candidate objects in the case where the ambiguous touch is detected, the candidate objects being the two or more objects located within the predetermined distance from the detected touched coordinates;

a step of sending information including candidate events to the server in order to let the server determine weights relating to an occurrence of the candidate events in the game, the candidate events being events associated with the candidate objects in the game, on the basis of the candidate events, an event or a sequence of events executed immediately before in the game, and an operation history of the player within the game, the operation history including information about executed events in the game;

a step of receiving the weights from the server; and a step of executing, in the game, the candidate event having the highest weight or presenting the player with a confirmation for the execution of the candidate events having the highest weight.

9. The non-transitory computer readable medium according to claim 8, wherein the step of detecting the detected touch as being an ambiguous touch is:

a step that is executed in a case where the detected touched coordinates do not fall within a coordinate range corresponding to the object, and wherein the program further causes the electronic device to execute:

a step of executing the event associated with the object in the case where the detected touched coordinates fall within the coordinate range corresponding to the object.

10. The non-transitory computer readable medium according to claim 8, wherein the weights are determined based on event history information that includes event frequency information representing the frequencies of occurrence of individual patterns of event sequences constituted of two or more consecutive events among past executed events.

11. The non-transitory computer readable medium according to claim 8, wherein the program causes the electronic device to further execute:

a step of sending information including executed events to the server in order to store the executed events at the server.

12. An electronic device having a display unit and a contact-type position input unit, the electronic device comprising:

a touched-position detecting part configured to detect a touched position corresponding to a touch on the contact-type position input unit by a player in the form of coordinates of the contact-type position input unit;

a screen displaying part configured to display a screen including objects associated with events in a game on the display unit;

an ambiguous-touch detecting part configured to detect, in the case where a touch on the contact-type position input unit is detected and two or more of the objects are located within a predetermined distance from the detected touched coordinates, the detected touch as being an ambiguous touch;

a candidate-object selecting part configured to select candidate objects in the case where the ambiguous touch is detected, the candidate objects being the two or more objects located within the predetermined distance from the detected touched coordinates;
a weight-determining part configured to determine weights relating to an occurrence of candidate events in the game, the candidate events being events associated with the candidate objects in the game, on the basis of the candidate events, an event or a sequence of events executed immediately before in the game, and an operation history of the player within the game, the operation history including information about executed events in the game; and
a candidate-event executing part configured to execute, in the game, the candidate event having the highest weight or a candidate-event presenting part configured to present the player with a confirmation for the execution of the candidate event having the highest weight.

13. A system including a server and an electronic device that is connected to the server via a network, that has a display unit and a contact-type position input unit, and that detects a touched position corresponding to a touch on the contact-type position input unit by a player in the form of coordinates on the contact-type position input unit, the server or the electronic device comprising:
a screen displaying part configured to display a screen including objects associated with events in a game on the display unit;
an ambiguous-touch detecting part configured to detect, in the case where a touch on the contact-type position input unit is detected and two or more of the objects are located within a predetermined distance from the detected touched coordinates, the detected touch as being an ambiguous touch;
a candidate-object selecting part configured to select candidate objects in the case where the ambiguous touch is detected, the candidate objects being the two or more objects located within the predetermined distance from the detected touched coordinates;
a weight-determining part configured to determine weights relating to an occurrence of candidate events, the candidate events being events associated with the candidate objects in the game, on the basis of the candidate events, an event or a sequence of events executed immediately before in the game, and an operation history of the player within the game, the operation history including information about executed events in the game; and
a candidate-event executing part configured to execute, in the game, the candidate event having the highest weight or a candidate-event presenting part configured to present the player with a confirmation for the execution of the candidate event having the highest weight.

14. A system according to claim 13,
wherein the ambiguous-touch detecting part is:
a part configured to detect the ambiguous touch in the case where the detected touched coordinates do not fall within a coordinate range corresponding to the object, and
wherein the electronic device further includes:
an event executing part configured to execute the event associated with the object in the case where the detected touched coordinates fall within the coordinate range corresponding to the object.

15. A system according to claim 13,
wherein the server or the electronic device in the system further comprises a storage part configured to store executed events, and
wherein the storage part:
creates event history information including event frequency information representing the frequencies of occurrence of individual patterns of event sequences constituted of two or more consecutive events in a history of the events stored in the storage part.

16. A system according to claim 15,
wherein the event frequency information includes information representing the frequencies of occurrence of individual patterns of event sequences constituted of not more than N (N≥2) consecutive events, and
wherein the weight determining part includes:
a score calculating part configured to calculate scores representing the possibilities of occurrence of the candidate events on the basis of the frequencies of occurrence of sequences of n (2≤n≤N) consecutive events in the event frequency information, the sequences of n consecutive events being constituted of an event or a sequence of events executed immediately before the candidate events and the candidate events.

17. A control method for a system including a server and an electronic device that is connected to the server via a network, that has a display unit and a contact-type position input unit and that detects a touched position corresponding to a touch on the contact-type position input unit by a player in the form of coordinates on the contact-type position input unit, the control method comprising:
a step of displaying a screen including objects associated with events in a game on the display unit;
a step of detecting, in the case where a touch on the contact-type position input unit is detected and two or more of the objects are located within a predetermined distance from the detected touched coordinates, the detected touch as being an ambiguous touch;
a step of selecting candidate objects in the case where the ambiguous touch is detected, the candidate objects being the two or more objects located within the predetermined distance from the detected touched coordinates;
a step of determining weights relating to an occurrence of candidate events in the game, the candidate events being events associated with the candidate objects in the game, on the basis of the candidate events, an event or a sequence of events executed immediately before in the game, and an operation history of the player within the game, the operation history including information about executed events in the game; and
a step of executing, in the game, the candidate event having the highest weight or presenting the player with a confirmation for the execution of the candidate events having the highest weight,
wherein each of these steps is executed by the server or the electronic device.

18. A control method according to claim 17,
wherein the step of detecting the detected touch as being an ambiguous touch is:
a step that is executed in the case where the detected touched coordinates do not fall within a coordinate range corresponding to the object, and
wherein the control method further comprises:
a step of executing the event associated with the object in the case where the detected touched coordinates fall within the coordinate range corresponding to the object, which is executed by the server or the electronic device.

* * * * *